United States Patent [19]
Russo

[11] Patent Number: 5,825,907
[45] Date of Patent: Oct. 20, 1998

[54] NEURAL NETWORK SYSTEM FOR CLASSIFYING FINGERPRINTS

[75] Inventor: Anthony Peter Russo, Bloomfield, N.J.

[73] Assignee: Lucent Technologies Inc., Murray Hill, N.J.

[21] Appl. No.: 893,668

[22] Filed: Jul. 11, 1997

Related U.S. Application Data

[63] Continuation of Ser. No. 364,914, Dec. 28, 1994, abandoned.

[51] Int. Cl.$^6$ .......................................................... G06K 9/00
[52] U.S. Cl. .......................... 382/124; 382/125; 382/224; 382/170; 382/156; 395/21; 395/24
[58] Field of Search ..................................... 382/124, 125, 382/156, 181, 170, 224; 395/24, 21

[56] References Cited

U.S. PATENT DOCUMENTS

| | | | |
|---|---|---|---|
| 5,140,642 | 8/1992 | Hsu et al. ................................ | 382/124 |
| 5,276,771 | 1/1994 | Manukian et al. ...................... | 395/24 |
| 5,465,303 | 11/1995 | Levison et al. ......................... | 382/124 |
| 5,519,785 | 5/1996 | Hara ........................................ | 382/124 |
| 5,572,597 | 11/1996 | Chang et al. ........................... | 382/125 |
| 5,659,626 | 8/1997 | Ort et al. ................................ | 382/125 |

OTHER PUBLICATIONS

D.S. Touretzky, *Advances in Neural Information Processing Systems 2*, Carnegie Mellon University, Morgan Kaufmann Publishers, pp. 405–411.

Rumelhart et al., "Learning Internal Representations by Error Propagation," *Parallel Distributed Processing: Explorations in the Microstructure of Cognition*, vol. 1, MIT Press, Cambridge, MA, 1985.

A.P. Russo, *An Automatic System for Fingerprint Analysis*, Master's Thesis, Rensselaer Polytechnic Institute, May 1986.

Mehtre et al. "Segmentation of Fingerprint Images—A composite Method," *Pattern Recognition*, vol. 22, No. 4, pp. 381–385, 1989.

Crawford et al., *Automated Fingerprint Identification: An Independent Study*, Yale University, Oct. 1991.

*Primary Examiner*—Jose L. Couso
*Assistant Examiner*—Anh Hong Do

[57] ABSTRACT

A system for automatically classification of human fingerprints. An unidentified fingerprint is processed to produce a direction map. The direction map is processed to generate a course direction map. The coarse direction map is input to a locally connected, highly constrained feed-forward neural network. The neural network has a highly structured architecture well-suited to exploit the rotational symmetries and asymmetries of human fingerprints. The neural network classifies the unidentified fingerprint into one of five classifications: Whorl, Double Loop, Left Loop, Right Arch and Arch.

10 Claims, 9 Drawing Sheets

*FIG. 3B*
RING 2

FIG. 3C
RING 3

FIG. 3D
RING 4

FIG. 3E
GLOBAL SECTIONS S1, S2, S3, AND S4

FIG. 6A
LEFT LOOP

FIG. 6B
RIGHT LOOP

FIG. 6C
ARCH

FIG. 6D
WHORL

FIG. 6E
DOUBLE LOOP

NEURAL NETWORK SYSTEM FOR CLASSIFYING FINGERPRINTS

This is a Continuation of application Ser. No. 08/364,914 filed Dec. 28, 1994, now abandoned.

BACKGROUND OF THE INVENTION

1. Field of the Invention

This invention relates generally to the field of fingerprint identification and, more particularly, to a system and method for automatically classifying a human fingerprint using a locally connected, highly constrained feed-forward neural network, whereby the classified human fingerprint can then be readily identified.

2. Related Art

For over 100 years, fingerprints have been the most reliable means of identifying an individual; this is borne out by the fact that no two identifying fingerprints have ever been found. Conventionally, fingerprints have been identified by manually trying to match an unknown fingerprint against a set of known fingerprints. Recently, however, automatic identification of fingerprints has attracted considerable research attention.

Currently, commercial products exist that compare unidentified fingerprints, or sets of fingerprints, with established record files stored in a database. However, the comparison process is still not fully automatic. Additionally, limitations set by processing speed and false matchings prevent current systems from comparing unidentified fingerprints with each record in the database. Some degree of prior classification, and a corresponding organization of the record file, are needed in order to limit the number of automatic comparisons. The classification of the unidentified fingerprint is conventionally done manually.

The currently available commercial systems work adequately with work loads and database sizes typical at state and local agencies. However, at the national level the identification problem is compounded in two ways; the number of identifications requested each day, and the size of the database to be searched, are both much larger. A classification system groups fingerprints according to some visually distinguishable set of features. Classification of a fingerprint helps reduce search time in identifying unknown fingerprints. However, the need for a highly accurate automatic classifier still exists. For a general description of fingerprint identification see Russo, A. P. *Automatic System For Fingerprint Analysis*, Master's Thesis, Rensselaer Polytechnic Institute, August 1986.

Neural networks (NNs) have emerged as powerful tools for automatic pattern recognition tasks, especially those for which conventional methods fall far short of human performance. A neural network is a computing system made up of many simple, interconnected processing elements. It processes information by its dynamic state response to external inputs. Each processing element receives a number of inputs which are weighted according to their significance. From the weighted total input, the processing element computes a single output signal. In computing the output signal, each processing element learns, i.e., the weights on the inputs change in response to a given input and output pair.

Neural networks are suitable for automatic pattern recognition because the neural networks' ability to "learn" makes them ideal for handling nonlinear problems, which often involve data that are noisy or imprecise. But while theory suggests the broad utility of neural networks, the design of the network remains a difficult task. Many variables must be considered, such as defining the network topology and discovering the optimal set of weights for the network topology. The chosen network topology must hold sufficient complexity to address the given classification task.

Locally connected, highly constrained feed-forward neural networks of a different typology have been applied to Optical Character Recognition (OCR). See Y. LeCun, "Generalization and Network Design Strategies," in R. Pfeifer et al., editors, *Connectionism in Perspective*, pp. 143–156, Elesevier Science Publishers, Amsterdam, The Netherlands, 1989 and C. Crawford and E. Mjolsness, "*Automated Fingerprint Identification: An Independent Study*," Yale University, October 1991, where they are designated as convolutional and bipyramidal networks, respectively. However, these specific neural network architectures are not primarily designed for recognition of images having radial features (e.g., fingerprints).

SUMMARY OF THE INVENTION

The present invention provides a method for automatically classifying a human fingerprint using a neural network. The neural network is input a coarse direction map of the fingerprint, which describes the direction of the ridge flow in local regions of the print. The neural network has a highly structured architecture well-suited to exploit the rotational symmetries and asymmetries of human fingerprints. In accordance with a preferred embodiment, the neural network uses square regions of the coarse direction map arranged in rings to emphasize the radial characteristics of fingerprint patterns. The neural network is trained by backpropagation to classify the print into one of the following classes: Left Loop, Right Loop, Arch, Whorl (except for Double Loop), or Double Loop. These classes can then be used to reduce the number of fingerprints to be searched for identification requests.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

Figure 2:
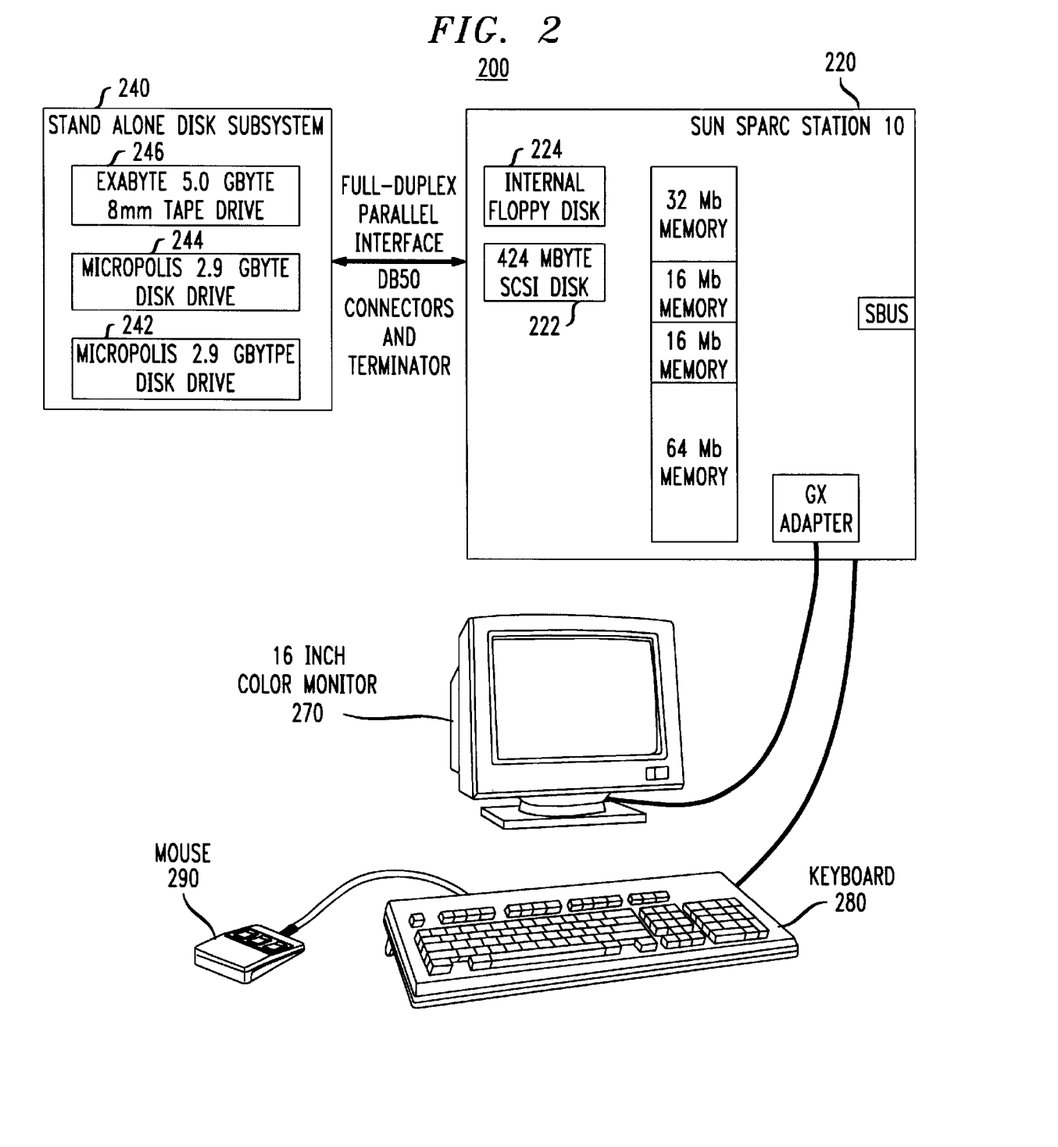
FIG. 2 illustrates the hardware platform 200 used in a preferred embodiment of the present invention.

FIG. 2 illustrates the hardware platform 200 used in a preferred embodiment of the present invention. It was chosen to ensure compatibility with, and a smooth transition to, a fully networked Automatic Fingerprint Identification System (AFIS). The hardware platform includes a Sun Sparc Station 10 220 with SuperSPARC 33 MHz uniprocessor (77.5 MIPS/46.6 SPECfp92), 128 Mbytes RAM, GX Adapter, 16" color monitor 270, mouse 290, keyboard 280, internal 424 Mbyte SCSI disk drive 222 and floppy disk drive 224. Monitor 270, keyboard 280, and mouse 290 are also provided to facilitate convenient data entry and display.

Speed and memory are required to quickly train a neural network. A stand alone disk subsystem 240 with two 2.9 Gbyte disk drives 242, 244 and 5.0 Gbyte EXABYTE 8 mm tape drive 246—the disk subsystem 240 will store fingerprint images to be processed. The high capacity tape drive 246 will allow convenient backup.

Figure 1:
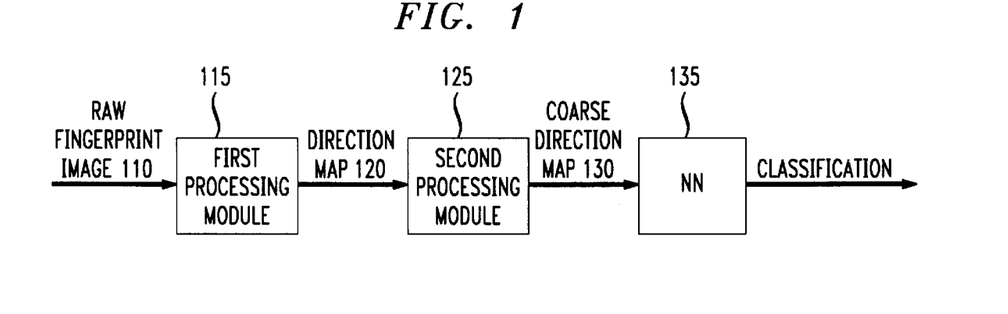
FIG. 1 is a functional block diagram of the present invention.
Figure 4A:
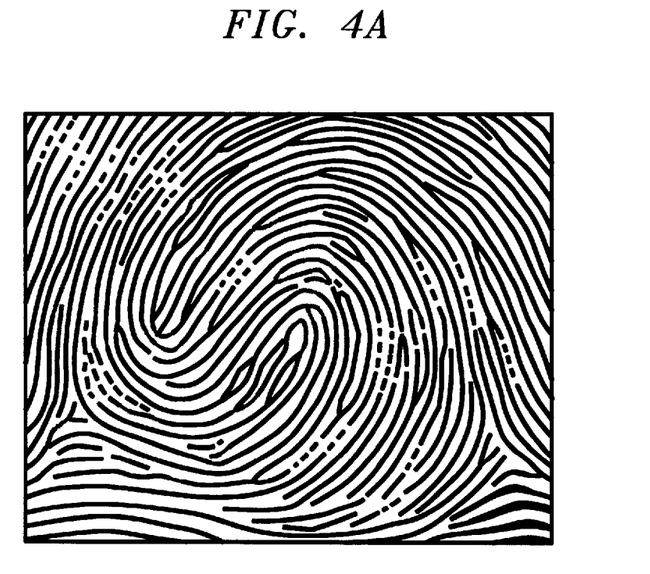
FIG. 4A shows an original fingerprint image before processing.
Figure 4B:
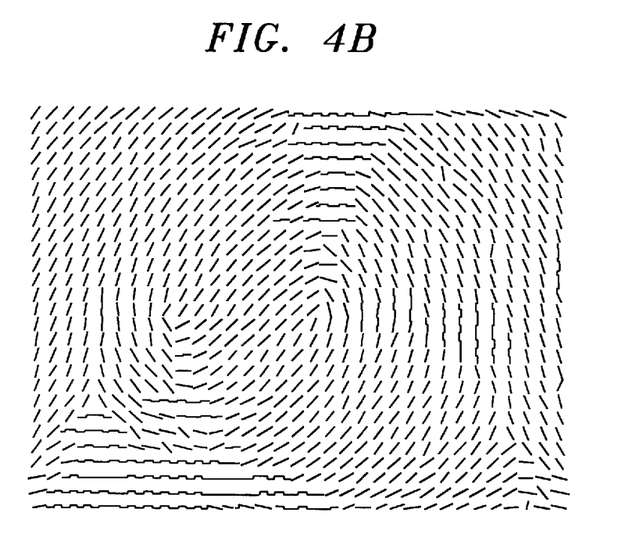
FIG. 4B shows a coarse direction map for the fingerprint image shown in FIG. 4A.

FIG. 1 is a functional block diagram of the present invention. Generally, a raw fingerprint image 110 is processed by a first processor module 115 to produce a pixel direction map 120. An exemplary raw fingerprint image is shown in FIG. 4A. The pixel direction map 120 is further processed by a second processor module 122 to produce a coarse direction map 130. An exemplary coarse direction map is shown in FIG. 4B. The course direction map 130 is used as an input to neural network classifier 135. The neural network classifier 135 outputs a fingerprint classification. In a preferred embodiment, the neural network classifier 135 classifies the original fingerprint 110 into one of the following classes: Left Loop, Right Loop, Arch, Whorl (except for Double Loop), or Double Loop. A fingerprint from each of these classifications is shown in FIGS. 6A through 6E, respectively.

The neural network architecture described herein can be used to identify other classes of fingerprints as well by modifying the inputs to neural network classifier 135 and/or neural network classifier 135 itself. Subclasses, like tented arches and central pocket loops, can be distinguished from plain arches and plain whorls, respectively, if the input coarse direction map 130 has enough resolution. Resolution can be increased, for example, at the expense of having more than 30×30 inputs to neural network classifier 135 (twice the resolution would imply 60×60 inputs). Resolution can also be increased by keeping only those 30×30 directions from the pixel direction map 120 that surround the fingerprint core (i.e., center). The fingerprint core can be identified by human or machine. Note that other areas of the fingerprint image 110 can be used as required and not just the fingerprint core.

The pixel direction map 120 (also referred to as a directional image) is created using the following equation:

$$\text{direction}(i,j) = \min \sum_{m=0}^{L} [|\text{raw\_image}(i_m,j_m) - \text{raw\_image}(i,j)|]$$

where direction (i,j) is the direction at pixel (i,j), raw_image (i,j) is the gray level value of the raw image at pixel (i,j), raw_image($i_m,j_m$) is the gray level value of the raw image along the extrapolation in direction m, and L is the number of pixels used in computation. Typically, L=10 and m=16. A detailed discussion of the creation of pixel direction map 120 can be found in B. M Mehtre and B. Chatterjee, "Segmentation of Fingerprint Images—A Composite Method," *Pattern Recognition*, Vol. 22, No. 4, pp. 381–385, 1989. See also L. O'Gorman and J. Nickerson, "An Approach to Fingerprint Filter Design," *Pattern Recognition*, pp. 29–38, January 1989.

The algorithms for creating pixel direction map 120 assign to each pixel in the original fingerprint image 110 a direction that approximates the direction of ridges in the neighborhood of that pixel. Ridges are defined as the raised lines on the finger surface that form the pattern of the print.

The pixel direction map 120 is used to generate a coarse direction map 130. Essentially, the raw fingerprint image 110 of size M×N pixels (typically 512×512 or 768×832) is preprocessed to extract a coarse P×Q direction map 120 (P=30 and Q=30 in a preferred embodiment). Directions are angles and range from 0 to Pi (i.e., 3.14. . . ). To obtain a coarse direction map 130 of size P×Q, the pixel direction map 120 is divided into P×Q regions, implying that each region is of size R=M/P×S=N/Q, where R and S are rounded to the nearest integer value. Then for a given region of size R×S, the coarse direction in the coarse direction map 130 is simply the most frequent direction of all the pixel directions in the region. For example, given a pixel map region of size 10×10 pixels, where 51 of the pixels have direction D and the rest have some other direction, then the direction of the region in the coarse direction map would be D.

The step of transforming the pixel direction map 120 to a coarse direction map 130 provides an effective means of data reduction without loss of information important to classifying the fingerprint. Nevertheless, fingerprint images are noisy, and even the highest quality image processing will result in a coarse direction map with imperfections. To ensure accurate classification, the neural network classifier must be robust to these artifacts as well as translation, rotation and elastic deformation of the print. Accordingly, a convolutional neural network is used in a preferred embodiment (i.e., a locally connected, highly constrained feedforward neural network). However, note that a fully-connected feedforward neural network or locally-connected feedforward neural network can also be used to implement the present invention.

Weight constraints in convolutional neural networks force the emergence of maps for feature extraction during the training cycle. Good neural network architecture design will incorporate specific knowledge of the problem to stimulate feature maps, and to incorporate smoothing layers to improve robustness to noise and image artifacts.

Besides accurate classification, there are other advantages to a convolutional neural network (see, e.g., A. P. Russo, "Tutorial Feedforward Neural Network Design for Signals and Images," *Conference on Neural Networks for Ocean Engineering*, Washington, D.C. (August 1991)), which include: constrained neural networks train faster and require fewer training samples; convolutional neural networks tend to be smaller and have fewer free parameters and connections; and convolutional neural network requires fewer training epochs, between 30 and 100, to reach peak generalization because of "hints" and prior knowledge built into the architecture.

A detailed description of the architecture used in a preferred embodiment of the present invention is set out below. Neural network classifier 135 has 30×30=900 input neurons which are fed the 30×30 directions from the coarse direction map 130. The actual value put into an input neuron is cos(direction), since cos(x) will range from −1 to +1 for the range of directions. This step ensures that the input neurons receive a smoothly defined, symmetric floating point data.

Figure 5:
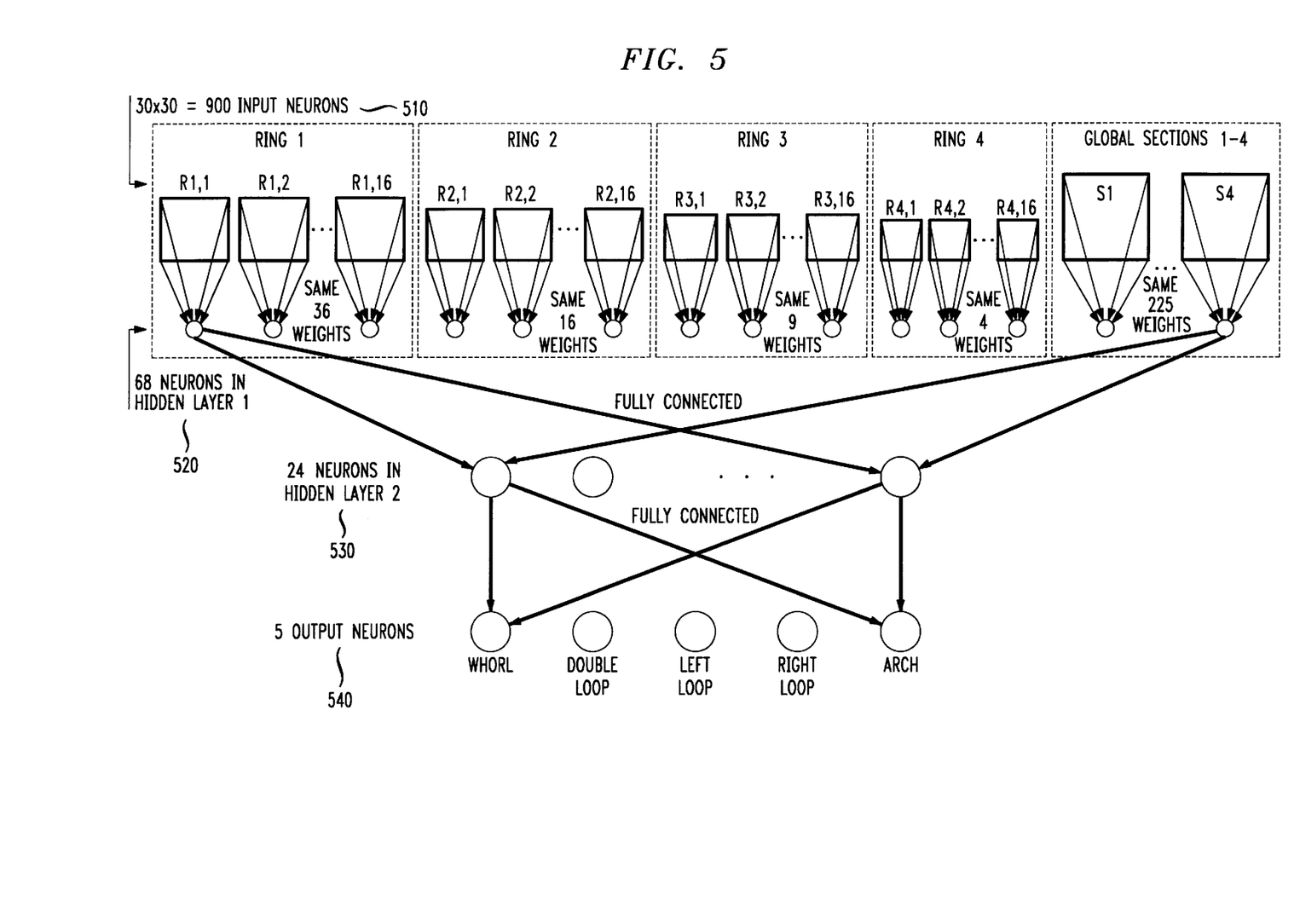
FIG. 5 shows the entire architecture of the neural network.
Figure 6A:
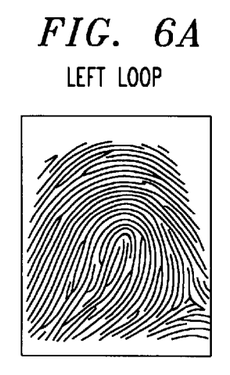
FIG. 6A through 6E show examples of an fingerprint in each of the classifications Arch, Whorl, Double Loop, Left Loop and Right Loop, respectively.
Figure 6B:
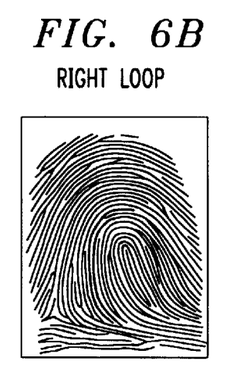
Figure 6C:
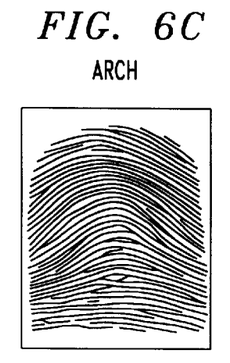
Figure 6D:
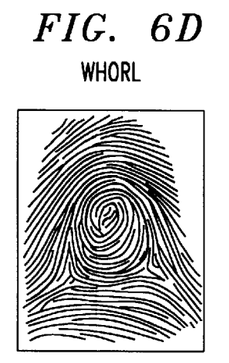
Figure 6E:
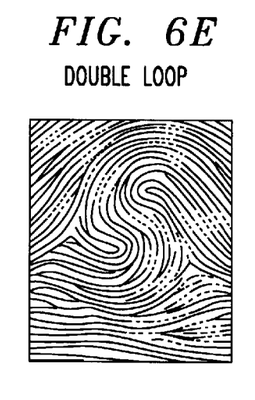

FIG. 5 illustrates a detailed architecture (including connectivity) of neural network 135. Neural network 135 has nine-hundred input neurons 510, sixty-eight neurons in a first hidden layer 520, twenty-four neurons in a second hidden layer 530, and five output neurons 540. The five output neurons 540 correspond to the five fingerprint classifications: Whorl, Double Loop, Left Loop, Right Loop, and Arch. In accordance with a preferred embodiment, neural network classifier 135 uses square regions of local connectivity arranged in rings to emphasize the radial characteristics of fingerprint patterns. This design provides a degree of rotational invariance.

Figure 3A:
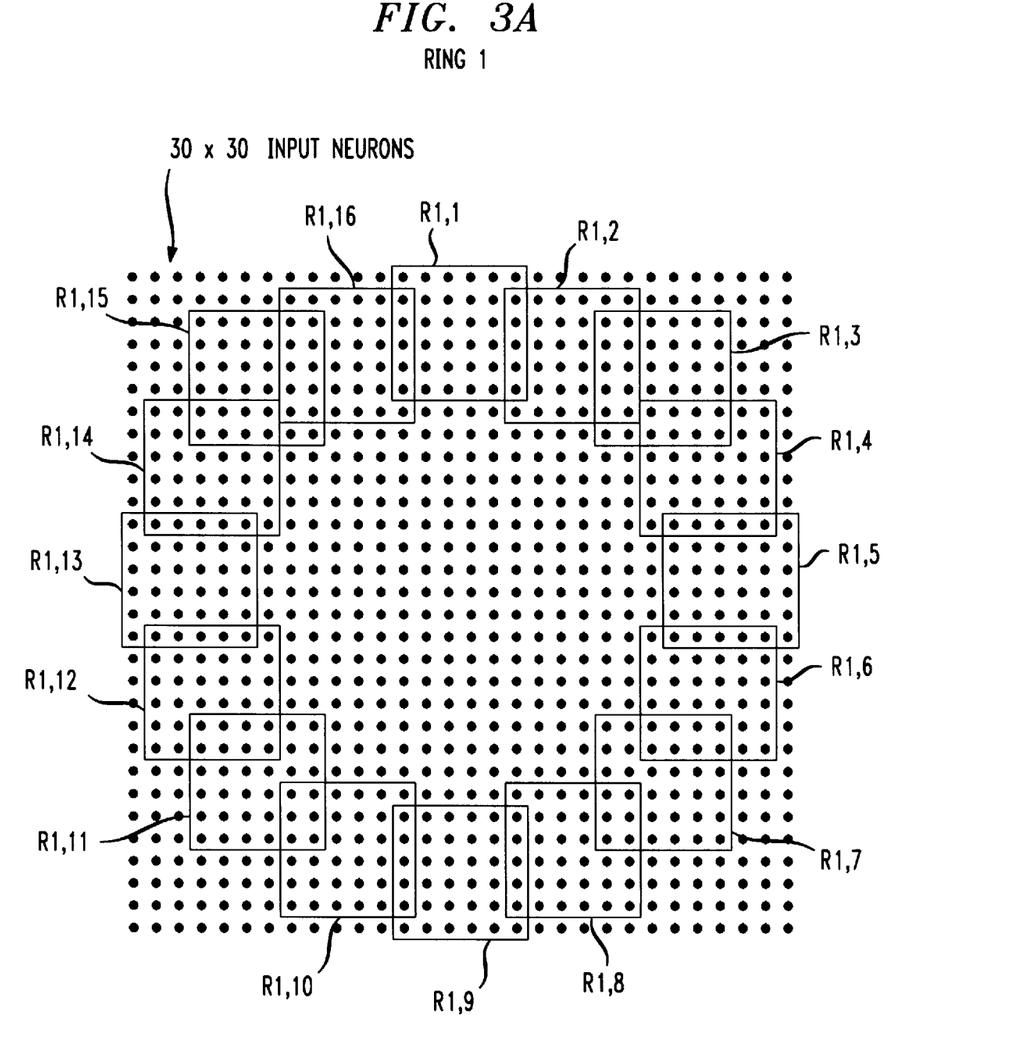
FIG. 3A through 3E show the architecture of the neural network's first layer of connections.

FIG. 3A illustrates a first input architecture. Input neurons 510 are grouped into 16 square regions of size 6×6=36 pixels that are arranged to overlap and form Ring 1. Each group of thirty-six input neurons in Ring 1 is connected to a designated neuron in first hidden layer 520 via thirty-six different, independent weights. Each region in Ring 1, however, uses the same set of thirty-six weights for the connections to its respective hidden layer neuron in first hidden layer 520. This is the technique of weight sharing: during training of neural network 135, the set of thirty-six weights of a given square region in Ring 1 is forced to be the same for any other square region in that ring. That is, inputs to neural network 135 are constrained to perform the same operation on different parts of the image. Weight Sharing is discussed in a variety of references including Touretzky, *Advances in Neural Information Processing Systems*2, Carnegie Mellon University, Morgan Kaufmann Publishers, pp. 409–411 and D. E. Rumelhart, G. E. Hinton, R. J. Williams, "Learning Internal Representations by Error Propagation," *Parallel Distributed Processing: Explorations in the Microstructure of Cognition*, Vol. 1, MIT Press, Cambridge, Mass., 1986.

Figure 3B:
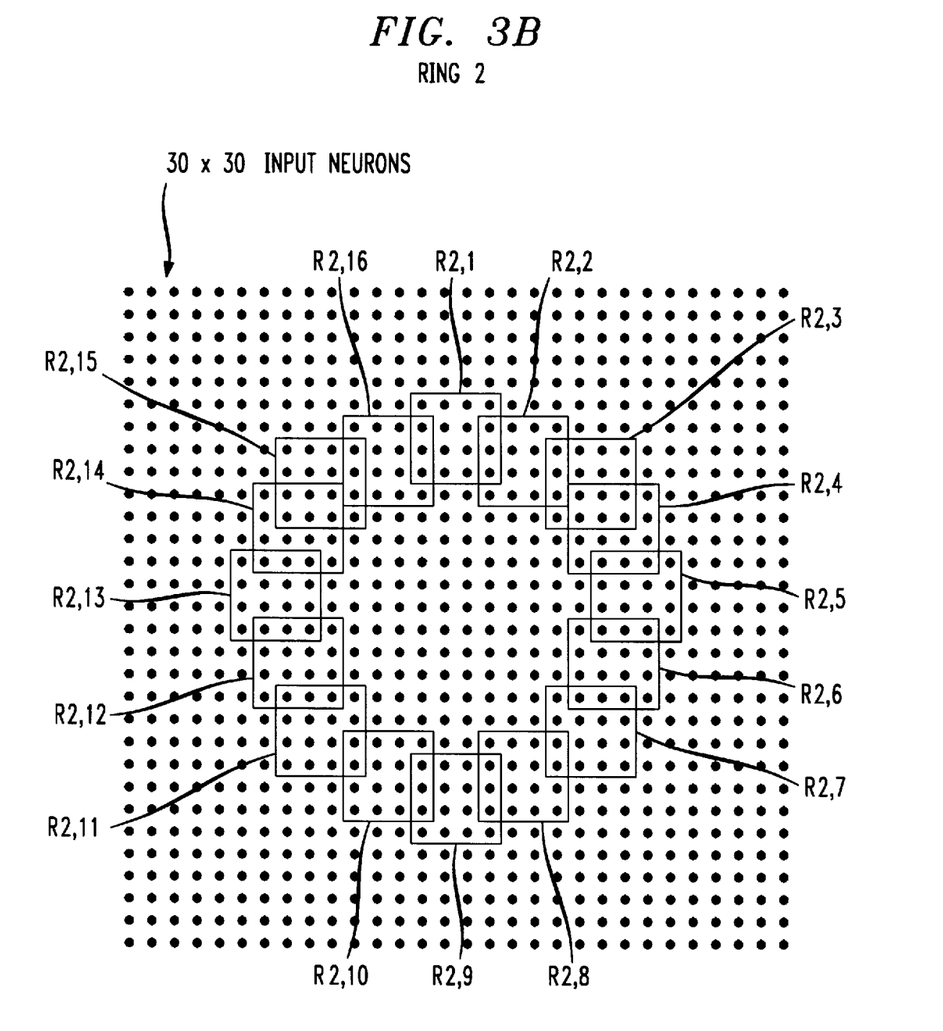

FIG. 3B illustrates a second input architecture. Ring 2 is formed in an analogous manner using sixteen square regions of size 4×4. Weight sharing is used in this ring as well. That is, the same set of sixteen weights are used for each region of Ring 2.

Figure 3C:
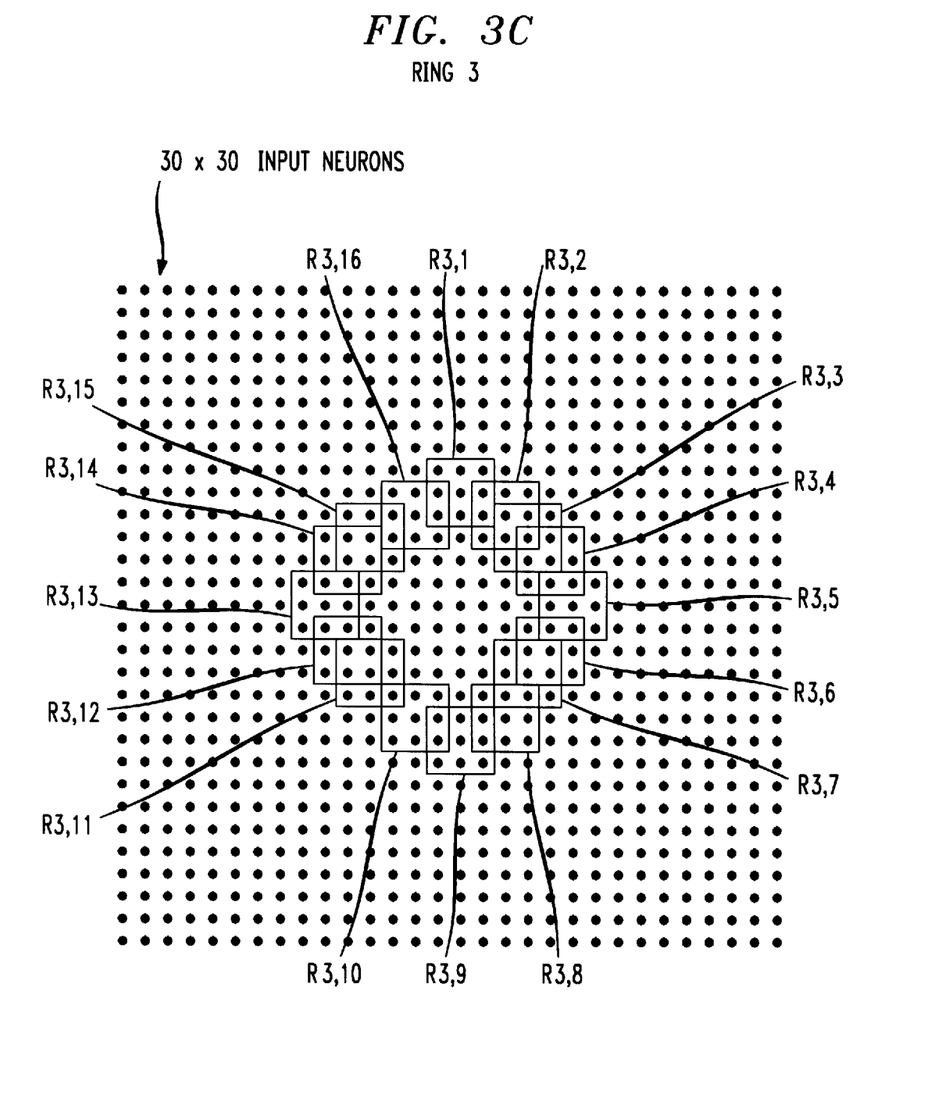

FIG. 3C illustrates a third input architecture. Ring 3 is formed from sixteen square regions of size 3×3. Again, weight-sharing is used for each group of nine weights.

Figure 3D:
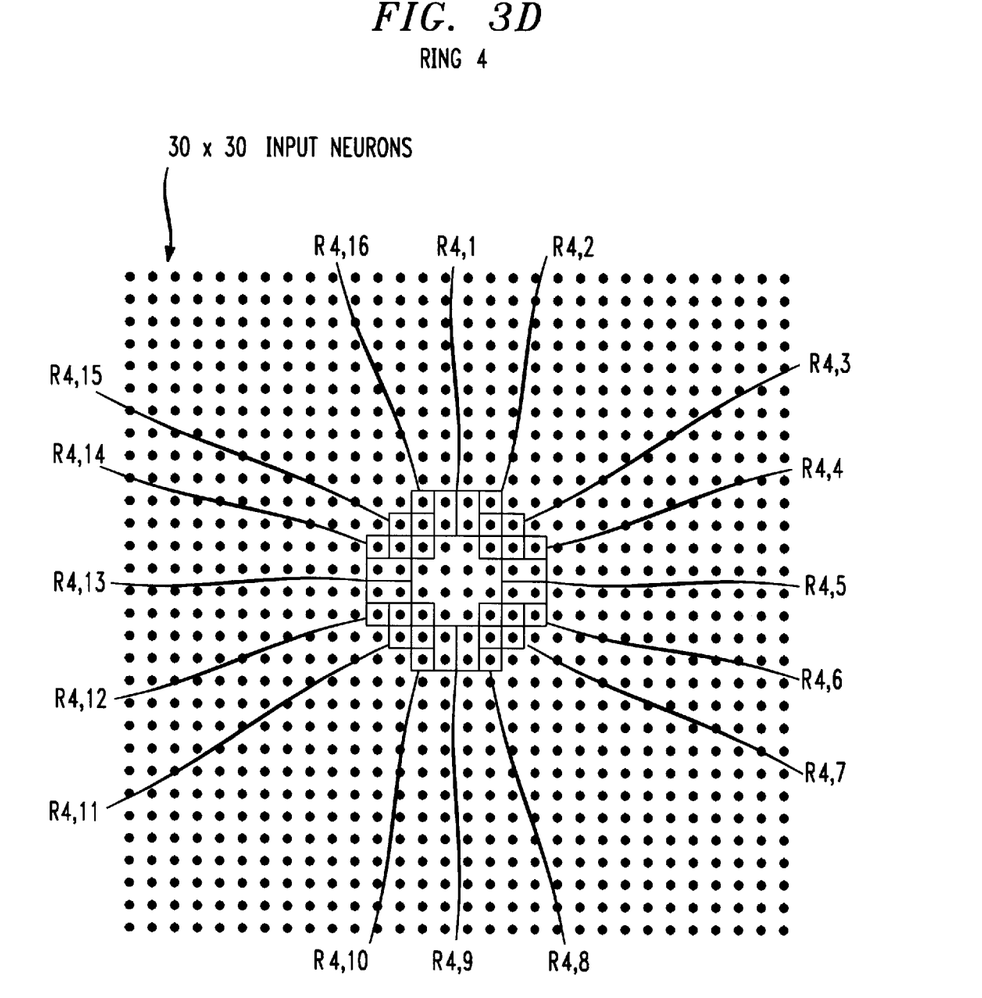

FIG. 3D illustrates a fourth input architecture. Ring 4 is formed from 16 square regions of size 2×2. Again, weight-sharing is used for each group of four weights.

It is important to note that overlapping regions are used to form the rings; overlapping is used to make the neural network more robust against translation and rotation of the fingerprint image 110.

Figure 3E:
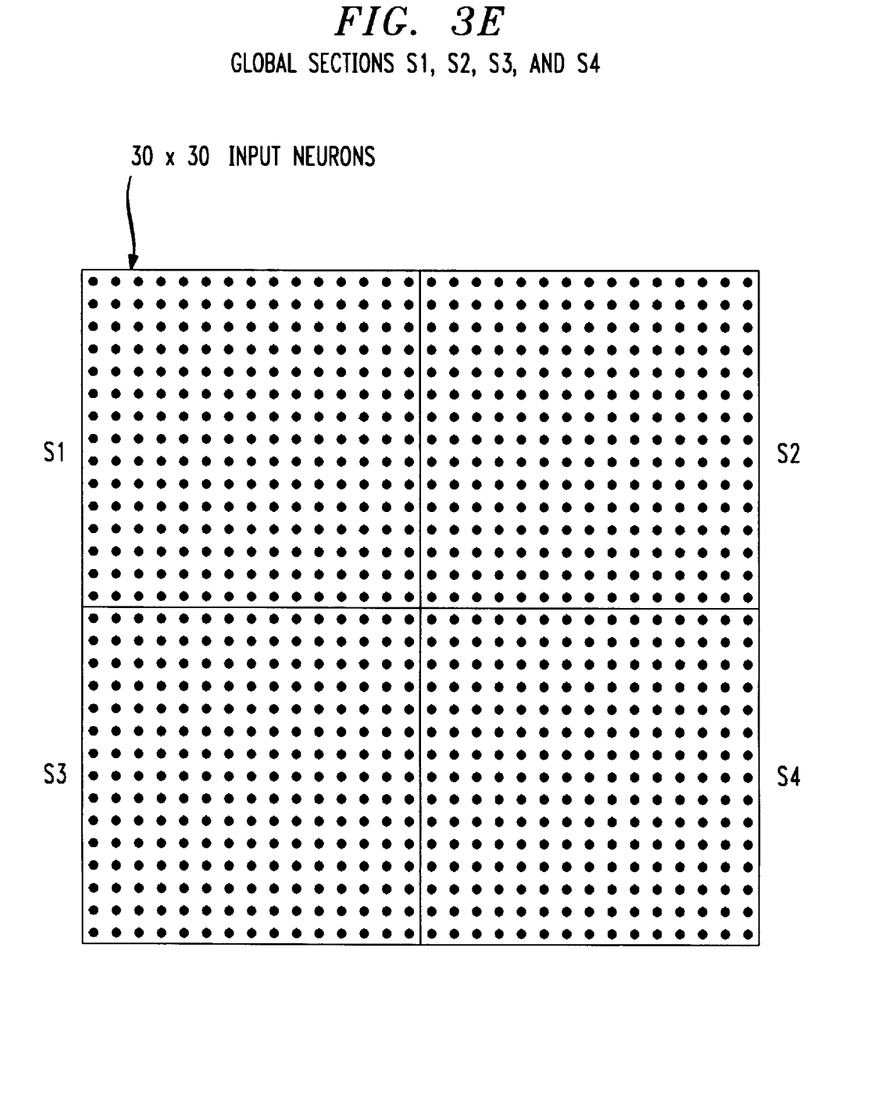

FIG. 3E illustrates a fifth input architecture. The nine hundred input neurons 510 are partitioned into four 15×15 squares or global sections. Again weight-sharing is used for each group of 225 weights. The global sections detect symmetries among the four quadrants of the image. They are used to impart knowledge of gross pattern differences.

Referring again to FIG. 5, regions of each ring are connected to a neuron in first hidden layer 520. In total, neural network classifier 135 has sixteen regions, each in Rings 1, 2, 3 and 4, plus four large rectangular sections. Thus, there must be 16+16+16+16+4=68 neurons in first hidden layer 520.

Neurons in second hidden layer 530 are fully connected to neurons in first hidden layer 520. That is, each neuron in second hidden layer 530 is connected to every neuron in first hidden layer 510. There are twenty-four neurons in second hidden layer 530; there is no weight-sharing used for these connections.

The output layer 540 is fully connected to second hidden layer 530. There are five output neurons, one for each pattern class. There is no weight-sharing used for these connections. The fingerprint is classified into one of the following classes: Left Loop, Right Loop, Arch, Whorl (except for Double Loop), or Double Loop.

The architecture of neural network 135 is designed to exploit the circular symmetry and asymmetry of the various fingerprint pattern types. The most important part of the neural network architecture is the connectivity from the input layer to the first hidden layer. Each ring evaluates the degree of symmetry of the fingerprint at its particular radius from the center. In particular, the collection of rings measures this symmetry at four different distances from the fingerprint image's center.

Generally, for a whorl pattern, the circular symmetry should hold for all four rings. For a double loop, this symmetry will hold for only the outer rings (i.e., Ring 1 and Ring 2). At all radii, left loops and right loops are fairly symmetric except for one quadrant (the lower left and lower right quadrants, respectively), so all four rings should easily detect the same asymmetry in the lower quadrant. Arches exhibit no circular symmetry but are rather symmetric across all four image quadrants; hence, the four large rectangular regions are used to detect these pattern types, where each rectangular region would detect the same (roughly) horizontal features. Note that, for obvious reasons, the four large rectangular regions are also helpful to detect the other pattern types.

Note that although two hidden layers are used in a preferred embodiment, other architectures can be implemented (e.g., one hidden layer, three hidden layer, etc) as should be readily apparent to those skilled in the art. Additionally, the present invention can be applied to images other than fingerprints. Essentially, the present invention can be implemented to recognize or classify images that have radial features.

The present invention is well suited to classify other types of images (not just fingerprints) with radial features. An example would be machine vision applications, where a robot might need to identify parts (e.g., screws and washers) from a bin. Gray-level images of those parts, providing the images are not too large in size, can be fed directly into neural network classifier 135 instead of the coarse map 130. In that case, the actual gray levels are input into neural network 135 instead of the cosine of the direction. While the neural network architecture might need to be modified to optimize performance for different images, the ring-like topology described above would produce a higher recognition rate.

Weight-sharing is used to minimize the number of free parameters that describe neural network 135. It is well known that neural networks with too many free parameters do not perform as well as, need more training exemplars, and take longer to train than neural networks with fewer free weights.

Training is accomplished using a standard backpropagation algorithm for feed-forward neural networks. Backpropagation is described in detail in D. E. Rumelhart, G. E. Hinton, R. J. Williams, "Learning Internal Representations by Error Propagation," *Parallel Distributed Processing: Explorations in the Microstructure of Cognition*, Vol. 1, MIT Press, Cambridge, Mass., 1986. In a preferred embodiment, a learning rate of 0.3 and a momentum term of 0.2 is used. This, of course, required a database of fingerprints whose true pattern class was labeled beforehand (by FBI experts), as backpropagation requires knowing what the activation level of each output neuron should be for each training example. (Activation level refers to the value of the output of a neuron.) In a preferred embodiment, during training, the output neuron corresponding to the true pattern class of the current example has a desired activation level of +1 and all other neurons have a desired level of −1. Therefore, it follows that a test example would be classified as the pattern corresponding to the output neuron with the highest activation level.

It should be understood that embodiments of the present invention can be implemented in hardware, software or a combination thereof. In such embodiment, the various component and steps would be implemented in hardware and/or software to perform the functions of the present invention. Any presently available or future developed computer software language and/or hardware components can be employed in such embodiments of the present invention.

While the invention has been particularly shown and described with reference to preferred embodiments thereof, it will be understood by those skilled in the art that various changes in form and details may be made therein without departing from the spirit and scope of the invention.

What is claimed is:

1. A system for classifying an unknown fingerprint image having a plurality of pixels, comprising,
   means for generating a pixel direction map from ridge directions found in the unknown fingerprint image;
   means for generating a coarse direction map by dividing said pixel direction map into regions and determining for each of the regions a coarse direction as a most frequent pixel direction within the region; and
   a neural network classifier having an input layer of neurons connected to receive said coarse direction map and connected to a hidden layer of neurons, wherein square regions of said input layer of neurons are arranged in a plurality or rings and connected to said hidden layer of neurons, said neural network classifier further includes an output layer of neurons that represent a plurality of fingerprint classifications.

2. The system of claim 1, wherein said neural network classifier classifies the unknown fingerprint image into either a left loop, a right loop, an arch, a whorl or a double whorl.

3. The system of claim 1, wherein said neural network classifier is a locally connected, highly constrained feed-forward neural network.

4. The system of claim 1, wherein said square regions within each of said plurality of rings overlap.

5. The system of claim 1, wherein global sections of said input layer of neurons are connected to said hidden layers of neurons, wherein said global sections are generated by dividing said coarse direction map into four equal quadrants.

6. The system of claim 1, wherein said input layer of neurons is connected to said hidden layer of neurons via a plurality of weights, each of said square regions within each of said plurality of rings from said input layer of neurons is connected via the same set of said plurality of weights to said hidden layer of neurons.

7. The system of claim 1, wherein said neural network classifier has at least two hidden layers.

8. The system of claim 7, wherein said at least two hidden layers include a first hidden layer connected to a second hidden layer using weight sharing.

9. The system of claim 8, wherein said neural network classifier evaluates the unknown fingerprint image from four different distances from the center of the unknown fingerprint image.

10. A system for classifying an unknown image having radial characteristics and a plurality of pixels, comprising,
    means for generating a pixel direction map from ridge directions found in the unknown image;
    means for generating a coarse direction map by dividing said pixel direction map into regions and determining for each of the regions a coarse direction as a most frequent pixel direction within the region; and
    a neural network classifier having an input layer of neurons connected to receive said coarse direction map and connected to a hidden layer of neurons, wherein square regions of said input layer of neurons are arranged in a plurality or rings and connected to said hidden layer of neurons, said neural network classifier further includes an output layer of neurons that represent a plurality of fingerprint classifications.

* * * * *